United States Patent
Schilling

(10) Patent No.: US 6,290,127 B1
(45) Date of Patent: *Sep. 18, 2001

(54) WIRELESS TELEPHONE DEBIT CARD SYSTEM AND METHOD

(75) Inventor: Donald L. Schilling, Sands Point, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/671,917

(22) Filed: Sep. 28, 2000

Related U.S. Application Data

(63) Continuation of application No. 09/421,733, filed on Oct. 20, 1999, now Pat. No. 6,170,745, which is a continuation of application No. 08/958,788, filed on Oct. 21, 1997, now Pat. No. 6,003,770, which is a continuation of application No. 08/685,595, filed on Apr. 26, 1996, now abandoned, which is a continuation of application No. 08/281,705, filed on Jul. 28, 1994, now abandoned, which is a division of application No. 07/956,851, filed on Oct. 6, 1992, now Pat. No. 5,359,182.

(51) Int. Cl.$^7$ .................................................. G06K 7/01
(52) U.S. Cl. ...................... 235/382.5; 235/375; 235/382; 235/380
(58) Field of Search ................................. 235/380, 375, 235/382, 382.5

(56) References Cited

U.S. PATENT DOCUMENTS

| | | | |
|---|---|---|---|
| 4,706,275 | 11/1987 | Kamil | 379/144 |
| 4,734,928 | 3/1988 | Weiner et al. | 455/551 |

(List continued on next page.)

FOREIGN PATENT DOCUMENTS

| | | |
|---|---|---|
| 4119924A | 12/1992 | (DE) . |

(List continued on next page.)

OTHER PUBLICATIONS

Crump, Jr., Stewart, Phone Service in Airplanes: A High-Flying Idea, Mobile Office, Apr. 1992, pp. 54–68.

(List continued on next page.)

*Primary Examiner*—Karl D. Frech
*Assistant Examiner*—Jamara A. Franklin
(74) *Attorney, Agent, or Firm*—Volpe and Koenig, P.C.

(57) ABSTRACT

A wireless debit card communications system comprising a radio unit, a base station, and an end station. The radio unit, for example, a radio telephone, includes a first processor, a reader for reading a credit amount and a personal access number from a debit card, and a transceiver for communicating, using radio waves, a credit signal. The base station receives and relays the credit signal over a communications channel to the end station. The end station includes a switch to generate a first control signal to allocate the credit amount of the debit card to the radio unit, and to set a radio unit access number of the radio unit to the personal access number of the debit card with a communications path through the base station. The end station also generates a second control signal for changing the credit amount and the personal access number of the debit card. The base station may be connected to a debit meter. The radio unit and the debit meter respond to the second control signal to change the credit amount and the personal access number using magnetic writers or writer processors to store an updated credit amount and personal access number on a magnetic strip on a debit card or on a chip on the debit card as the debit card is used in the radio unit. The personal access number may be used as a telephone number of the radio unit.

16 Claims, 9 Drawing Sheets

U.S. PATENT DOCUMENTS

| | | | |
|---|---|---|---|
| 4,757,186 | 7/1988 | Heberle et al. | 235/380 |
| 4,759,056 | 7/1988 | Akiyama | 379/197 |
| 4,763,354 | 8/1988 | Fukushima et al. | 379/165 |
| 4,782,217 | 11/1988 | Soza et al. | 235/380 |
| 4,795,892 | 1/1989 | Gilmore et al. | 235/381 |
| 4,833,702 | 5/1989 | Shitara et al. | 455/465 |
| 4,845,740 | 7/1989 | Tokuyama et al. | 455/409 |
| 4,860,341 | 8/1989 | D'Avello et al. | 379/357 |
| 4,868,849 | 9/1989 | Tamaoki | 379/357 |
| 4,879,744 | 11/1989 | Tasaki et al. | 379/144 |
| 4,891,503 | 1/1990 | Jewell | 235/380 |
| 4,897,870 | 1/1990 | Golden | 379/144 |
| 4,907,257 | 3/1990 | Asano et al. | 379/144 |
| 5,003,585 | 3/1991 | Richer | 379/144 |
| 5,109,540 | 4/1992 | Dzung et al. | 455/575 |
| 5,138,648 | 8/1992 | Palomeque et al. | 379/22 |
| 5,138,650 | 8/1992 | Stahl et al. | 455/408 |
| 5,146,217 | 9/1992 | Holmes et al. | 340/825.44 |
| 5,148,472 | 9/1992 | Freese et al. | 455/408 |
| 5,173,936 | 12/1992 | Ditzig et al. | 379/440 |
| 5,179,373 | 1/1993 | John | 340/825.15 |
| 5,197,092 | 3/1993 | Bamburak | 455/417 |
| 5,220,593 | 6/1993 | Zicker et al. | 455/407 |
| 5,251,248 | 10/1993 | Tokunaga et al. | 455/461 |
| 5,266,782 | 11/1993 | Alanara et al. | 235/380 |
| 5,297,189 | 3/1994 | Chabernaud | 455/461 |
| 5,297,192 | 3/1994 | Gerszberg | 455/419 |
| 5,325,424 | 6/1994 | Grube | 379/93.03 |
| 5,359,182 * | 10/1994 | Schilling | 235/380 |
| 5,371,493 | 12/1994 | Sharpe et al. | 340/5.42 |
| 5,371,785 | 12/1994 | Marcinkiewicz | 379/267 |
| 5,396,650 | 3/1995 | Terauchi | 455/38.2 |
| 5,404,580 | 4/1995 | Simpson et al. | 455/558 |
| 5,577,104 | 11/1996 | Knuth et al. | 379/67.1 |
| 6,003,770 * | 12/1999 | Schilling | 235/382.5 |
| 6,035,025 * | 3/2000 | Hanson | 379/144 |
| 6,170,745 * | 1/2000 | Schilling | 235/382.5 |

FOREIGN PATENT DOCUMENTS

| | | |
|---|---|---|
| 3702509A | 8/1998 | (DE) . |
| 0276403 | 8/1988 | (EP) . |
| 502446A | 9/1992 | (EP) . |
| 2246269 | 1/1992 | (GB) . |
| 0244164 | 10/1986 | (JP) . |
| 0044662 | 2/1989 | (JP) . |
| 0080717 | 4/1991 | (JP) . |
| 08130592-A * | 5/1996 | (JP) . |

OTHER PUBLICATIONS

Snow, Richard "'The Future': GSM–features versus the cost (cellular radio)" IEE Colloquium on Mobile Communications, pp. 511–513, 1990.

Walker, Michael, "Security in Mobile and Cordless Telecommunications" CompEuro '92, 'Computer Systems and Software Engineering', Proceedings, pp. 493–496, May 1992.

Arndt, G. et al., "International Standards on Universal Personal Telecommunications: State of the Art and Future Projections", ICUPC '92 Proceedings, Oct. 1992 pp. 03.01/1–03.01/5.

Jose Luis Zoreda and Jose Manuel Oton, *Smart Cards*, Artech House, pp. 158–160 and 173–175 (1994).

* cited by examiner

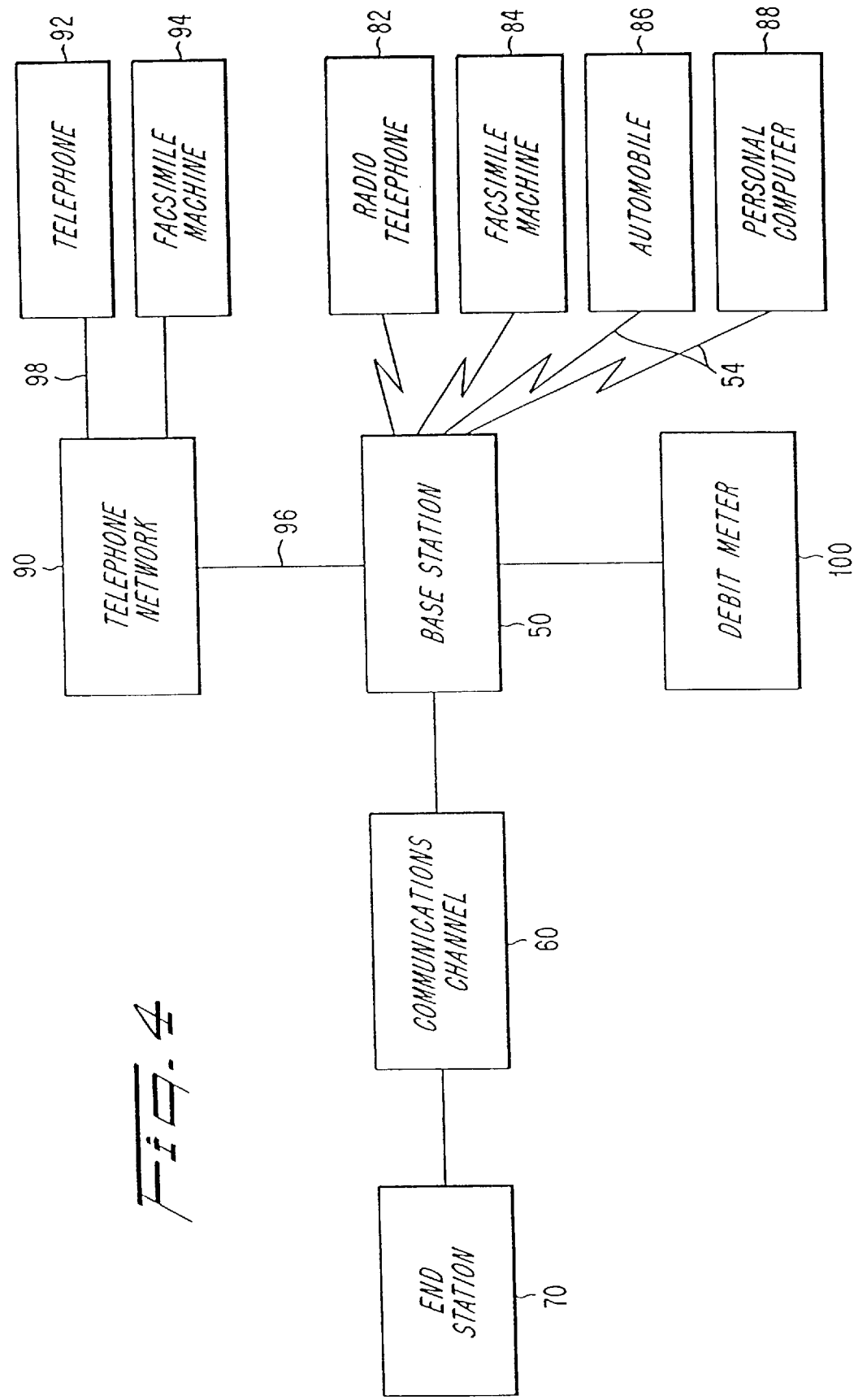

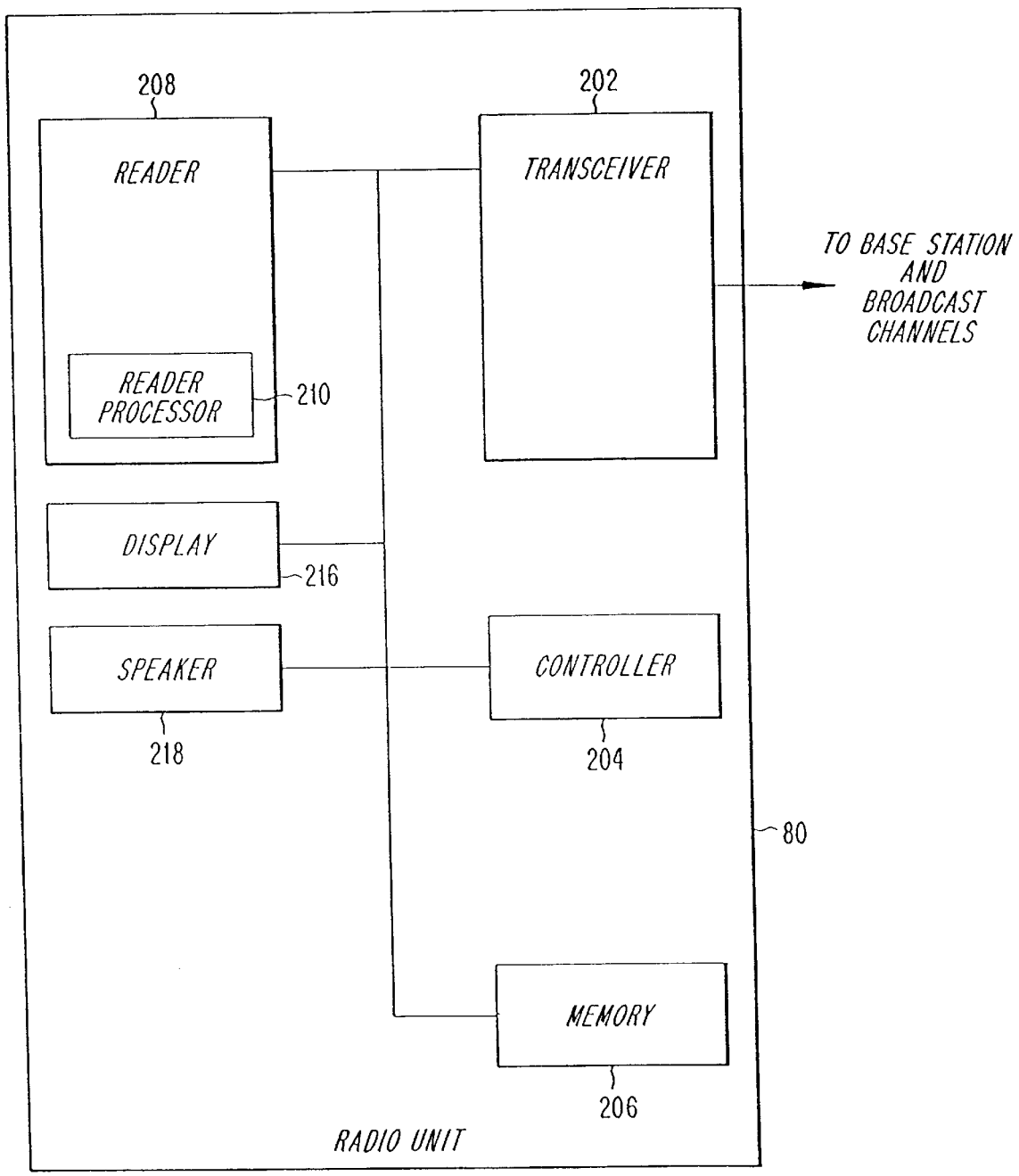

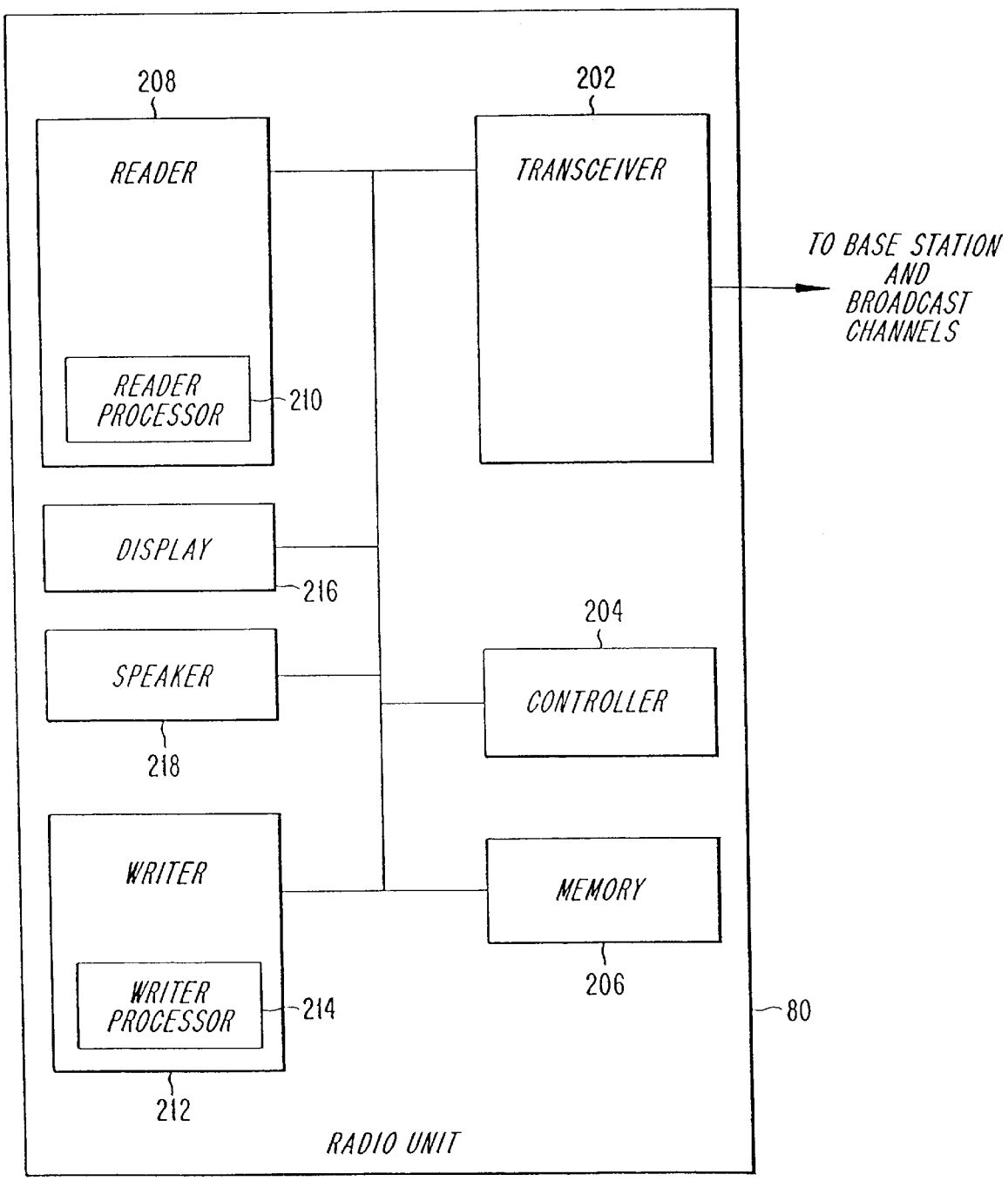

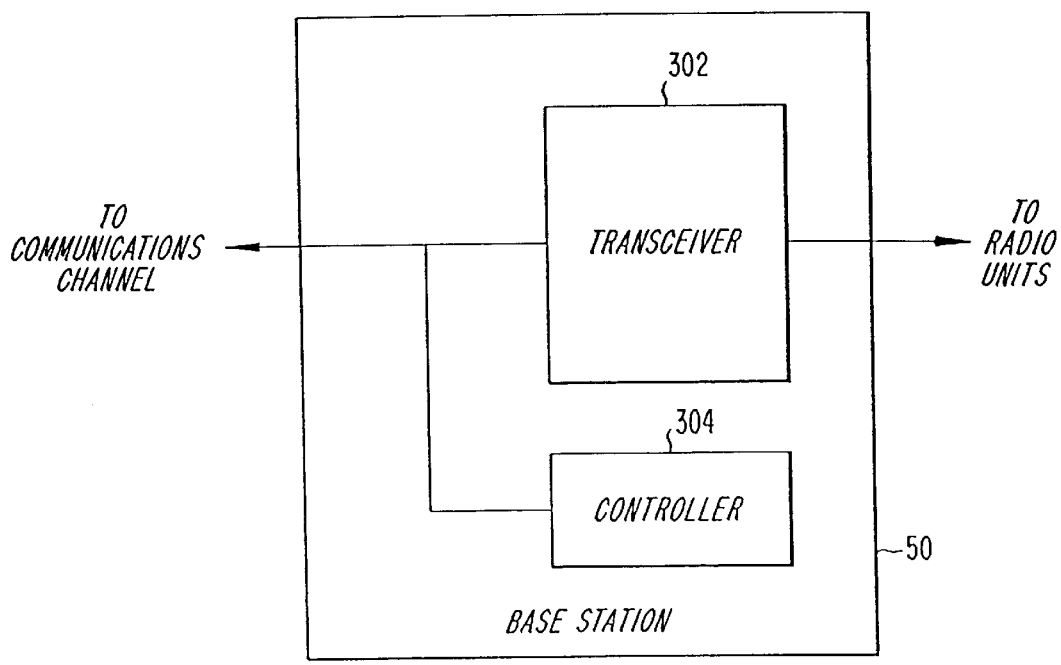
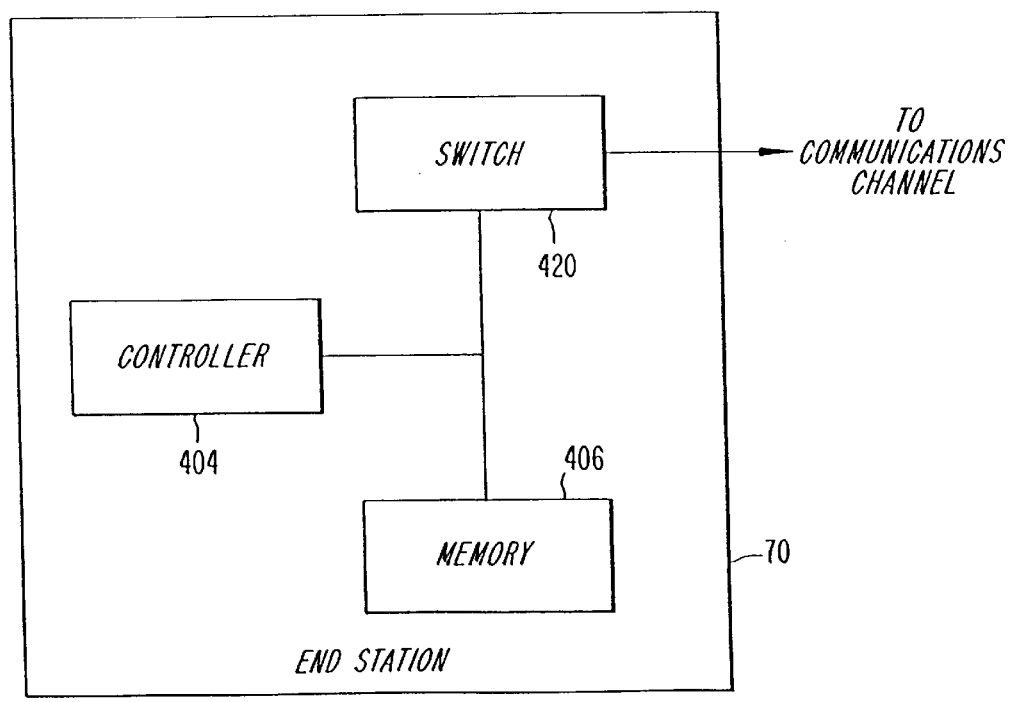

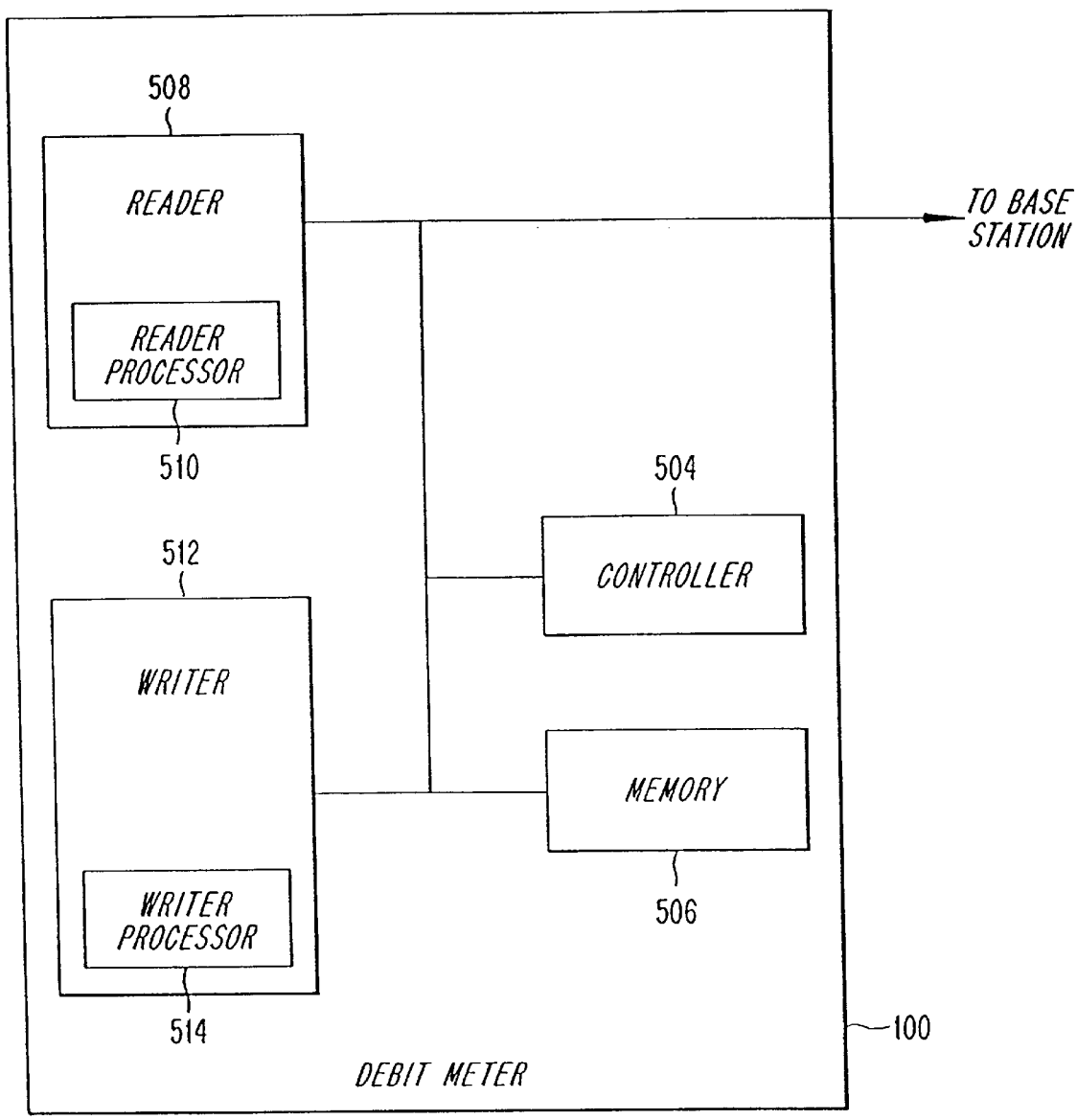

WIRELESS TELEPHONE DEBIT CARD SYSTEM AND METHOD

REFERENCE TO RELATED APPLICATIONS

This is a continuation of application Ser. No. 09/421,733, now U.S. Pat. No. 6,170,745, filed Oct. 20, 1999, which is a continuation of application Ser. No. 08/954,788, filed Oct. 21, 1997, which is now U.S. Pat. No. 6,003,770, issued Dec. 21, 1999, which is a continuation of application Ser. No. 08/685,595 (Abandoned), filed Apr. 26, 1996 which is a continuation of application Ser. No. 08/281,705 (Abandoned), filed Jul. 28, 1994 which is a divisional of application Ser. No. 07/956,851, filed Oct. 6, 1992, now U.S. Pat. No. 5,359,182.

BACKGROUND OF THE INVENTION

This invention relates to wireless debit cards, and more particularly to the application of a wireless debit card to a radio telephone system.

DESCRIPTION OF THE RELEVANT ART

Credit cards, debit cards, point of sale (POS) cards, automatic teller machine (ATM) cards, declining balance cards, and the like have been used in the art for some time. In operation with the telephone networks, credit cards termed calling cards are available where a user with an account uses the calling card to access the telephone network. In accessing the telephone network, the calling card may be inserted through the slot of a telephone to a card reader, or alternatively, an account number on the card may be entered in the telephone, for example, by a touch-tone keypad. In either case, the amount of the telephone call is charged to the user's calling card account for later payment.

Similarly, a user may purchase a debit card for a certain amount of credit for purchases and charges. For example, charges to telephone calls, with the credit allocated to the debit card, are deducted from the amount of credit purchased. In use, the user inserts the debit card into a pay telephone and the available credit on the debit card is debited for the amount used.

A problem with prior art debit card and credit card systems is that the debit/credit card systems have generally been limited to the existing fixed position telephone network, with the debit/credit card systems relying primarily on fixed telephones and general purpose pay telephones for initiating telephone calls.

In addition, the existing card storage systems provide for identification data and other data to be stored on the card, for example, by using magnetic strips to be read by a magnetic swipe reader. Existing smartcards and future card storage systems promise to provide greater detail regarding the card user, with the greater detail stored on a card having greater storage capacity, for example, a card including one or more computer chips having a memory. The computer chips may also include microprocessors in addition to the memory, with the microprocessors allowing the user with the debit/credit card to access computer systems with the debit/credit card. Furthermore, the use of the computer chips with memories allows the storage and access of data beyond user identification; for example, computer chips can include user addresses and telephone numbers, credit and debit account histories, and available credit and debit limits.

However, the prior art has limited the use of the card storage systems to fixed pay telephones having card readers, primarily by magnetic swipe readers reading debit/credit cards with magnetic strips. In the prior art, telephones without card readers, for example, non-pay telephones and mobile cellular telephones, can only access the existing telephone network using debit/credit cards by entering an account number and/or a personal identification number (PIN) in the telephone. The advantages of developments in card storage systems to hold greater information about the user and the user's account activities are unable to be fully implemented by the prior art.

Furthermore, debit/credit card systems used in conjunction with the existing telephone networks are limited to the accessing of the telephone network to make telephone calls. The prior art does not provide for the reception of telephone calls to users accessing the telephone network with a credit card or debit card, unless the user leaves the telephone number of the telephone being accessed with a listener. In addition, some pay telephones may not be permitted, by the operating telephone company, to send calls to the pay telephones, i.e. some pay telephones allow calls out from the pay telephone but do not allow calls in to the pay telephone, since the telephone company does not receive payment for calls in to the pay telephone in the same manner as payment for calls out from the pay telephone.

The present telephone network switches telephone calls for a user to fixed telephone numbers with the fixed telephone numbers allocated to specific telephones, so a user is limited to receiving telephone calls to fixed telephone numbers and to specific telephones. The prior art does not provide for the automatic switching of telephone calls to users, especially travellers, at telephones which are not allocated to the users.

Moreover, present debit/credit card systems have been limited in application to merchant point of sale (POS) applications and to the described uses with telephones. Other consumer electronic applications, for example, personal computers, facsimile machines, and automobiles would also benefit from a wireless debit card system in providing a debit card system free from specifically allocated telephone numbers.

OBJECTS OF THE INVENTION

An object of the invention is a wireless debit card system which allows a user to prepay for telephone usage.

Another object of the invention is a wireless debit card system which allows the user to receive telephone calls at a debit card telephone.

A further object of the invention is a wireless debit card system wherein the telephone number follows the user on his debit card, as opposed to the telephone number being allocated to a specific telephone line.

An additional object of the invention is a wireless debit card system using radio units for accessing telephone networks with smartcards as debit cards, wherein the smartcards are read by the radio unit.

A further object of the invention is a wireless debit card system allowing telephones, facsimile machines, personal computers, automobiles, and the like to communicate using debit cards.

A still further object of the invention is a wireless debit card system allowing users to use telephones, facsimile machines, personal computers, automobiles, and the like with telephone numbers which follow the user on his/her debit card, as opposed to the telephone number being allocated to a specific telephone line.

SUMMARY OF THE INVENTION

According to the present invention, as embodied and broadly described herein, a wireless debit card system comprising at least one radio unit, at least one base station, and at least one end station. Each end station typically has a communications switch. Each of the radio units typically has means for reading from a debit card a credit amount and a personal access number. Each of the radio units also has means for communicating, using radio waves, the credit amount and the personal access number as a credit signal. The base stations receive the credit signal from each of the radio units and relay the credit signal over a communications channel to the end stations. Each end station has a communications switch which is responsive to receiving a plurality of credit signals. In response to receiving the plurality of credit signals, the communications switch allocates the credit amount for each radio unit, and also sets, within the communications switch, the personal access number for each debit card for each radio unit. A communications channel identified with each personal access number is assigned a path through the base station.

The present invention also includes a method, using a wireless debit card system including a radio unit, a base station, and an end station, comprising the steps of accessing the radio unit with a debit card; reading a credit amount and a personal access number from the debit card; generating a credit signal from the credit amount and the personal access number; transmitting the credit signal over a communications channel; receiving the credit signal at a base station; relaying the credit signal from the base station to the end station over the communications channel; switching the credit signal at the end station; allocating the credit amount of the debit card to the radio unit with a communication path through the base station; and setting a radio unit access number of the radio unit to the personal access number of the debit card with a communication path through the base station.

Additional objects and advantages of the invention are set forth in part in the description which follows, and in part are obvious from description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIG. 4 shows an alternate embodiment of the wireless debit card system with various electronic devices accessing the wireless debit card system via radio waves and wired connections;

FIG. 5 illustrates a radio unit of the present invention;

FIG. 6 illustrates an alternate embodiment of the radio unit of the present invention;

FIG. 7 illustrates a base station of the present invention;

FIG. 8 shows an end station of the present invention;

FIG. 9 shows a debit meter of the present invention;

DETAILED DESCRIPTION OF THE PREFERRED EMBODIMENTS

Figure 1:
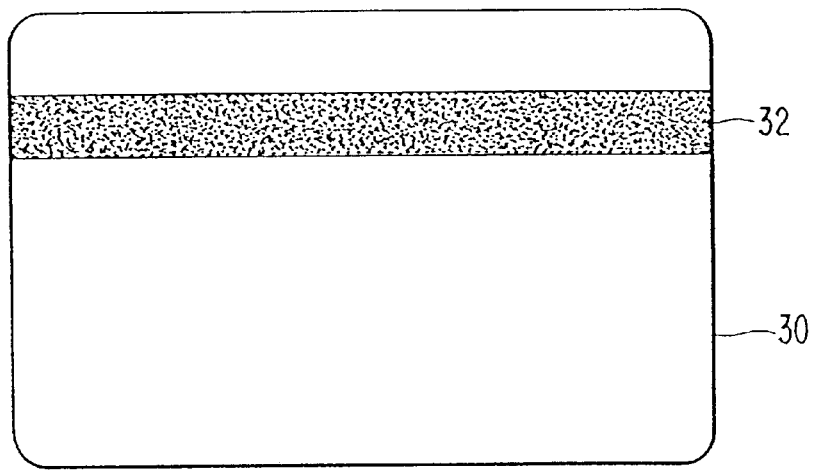
FIG. 1 shows a prior art debit/credit card having a magnetic strip.

Reference now is made in detail to the present preferred embodiments of the invention, examples of which are illustrated in the accompanying drawings, wherein like reference numerals indicate like elements throughout the several views.

As illustratively shown in FIG. 1, a prior art debit/credit card 30 having a magnetic strip 32 permits the user or cardholder to access debit/credit card system by passing the debit/credit card 30 pass through or by having the debit/credit card 30 swiped through a magnetic card reader to read the information stored in a magnetic format on the magnetic strip 32. In addition, although the magnetic strips 32 are primarily used to encode and store identifying information, for example, as a debit/credit card account number, the magnetic strips 32 may also be used to encode and store additional information beyond identification information; for example, available credit and debit limits may be encoded and stored on the magnetic strip 32. A debit/credit card 30 with a magnetic strip 32 may be used repeatedly in any compatible magnetic strip reader, and the magnetic strip 32 may further be rewritten by any compatible magnetic strip reader which is also equipped with a magnetic strip writer capable of encoding different or updated information in a magnetic format onto the magnetic strip 32 of the debit/credit card 30.

The use of debit/credit cards in commerce is widespread, and further applications of debit/credit cards are being implemented. Some applications may utilize debit/credit cards called smartcards, with smartcards being capable of storing greater amounts of information and capable of accessing more diverse consumer applications. In the prior art, some debit/credit smartcards 34 are equipped with computer chips 36 having memories, as illustratively shown in FIG. 2. In use, the user places the debit/credit smartcard 34 into a compatible card accessing device to read and access the information stored in the memory of the computer chip 36. The computer chips 36 are not limited to using silicon chips, and the computer chips 36 may further be equipped with microprocessors including or in addition to the memories. Furthermore, the computer chips 36 may also be equipped with minute batteries or energy cells, allowing for volatile memories to be used to store the information in the memory and, therefore, on the debit/credit smartcard 34.

The debit/credit cards 34 with computer chips 36 having memories may also be rewritten by a compatible accessing device equipped with a processor capable of writing and rewriting information to the memory of the computer chip 36 on the debit/credit card 34.

The use of the computer chips with memories allows the storage and access of data not limited to user identification; for example, the computer chips can include user addresses and telephone numbers, credit and debit account histories, and available credit and debit limits.

The existing debit/credit card systems primarily employ debit/credit card readers/writers accessing debit/credit account databases through the existing telephone networks using modems connecting the debit/credit card readers/ writers to the telephone networks, for example, as public switched telephone networks (PSTN).

Figure 3:
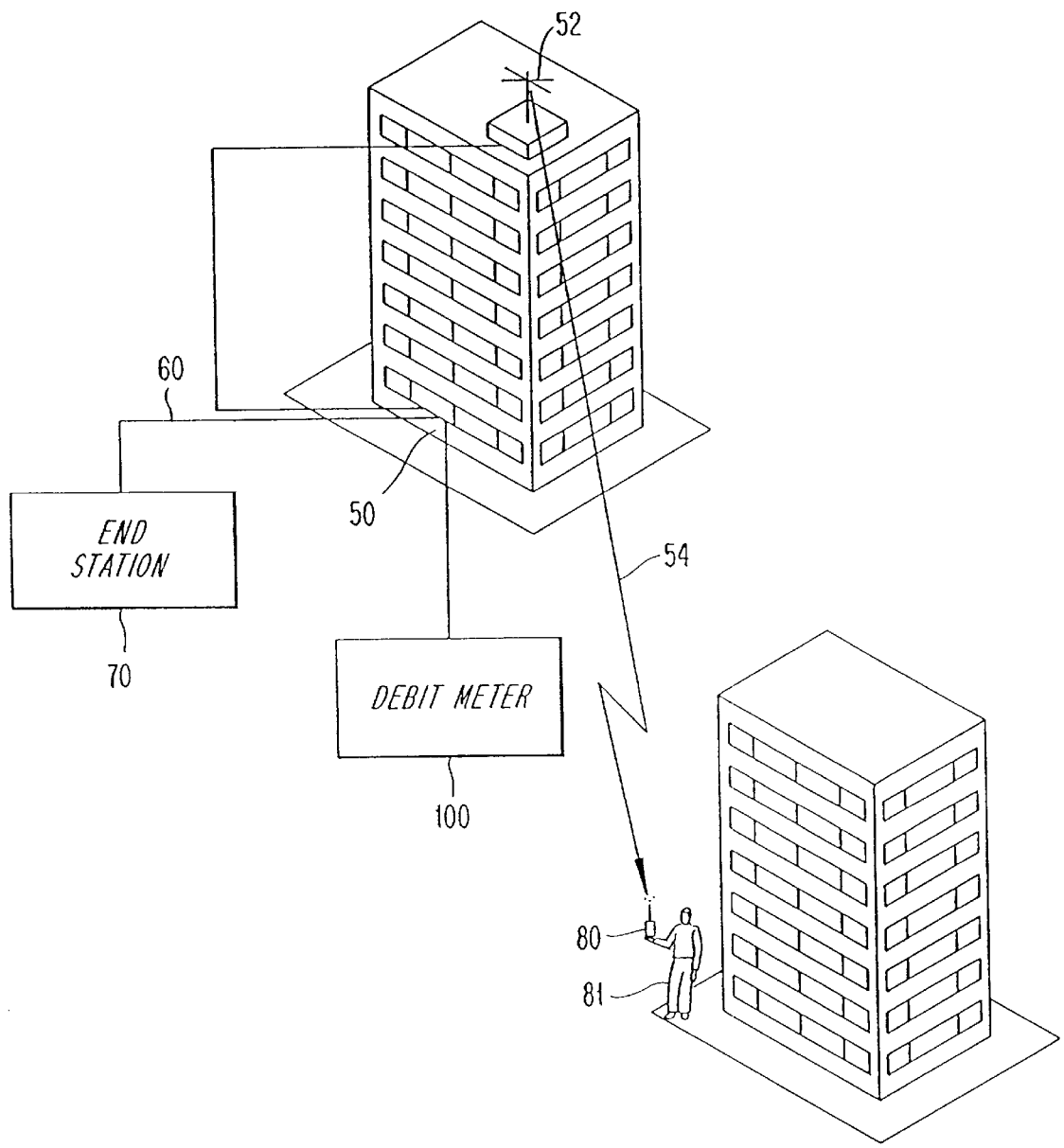
FIG. 3 shows a wireless debit card system with a user having a radio unit accessing a base station.

In the exemplary arrangement shown in FIG. 3, the wireless debit card system is shown comprising at least one radio unit 80, at least one base station 50, and at least one end station 70. Each end station 70 typically has a communications switch, and the end station 70 may be embodied as an end office; for example, a class 5 office. Each of the radio units 80 typically has means for reading a credit amount and a personal access number stored on a debit card. Each of the radio units 80 also has means for communicating, using radio waves, the credit amount and the personal access number as a credit signal. The credit signal may further include synchronization data. The base stations 50 receive the credit signal from each of the radio units 80 and relay the credit signal over a communications channel 60 to the end stations 70. Each end station 70 has a communications switch which is responsive to receiving a plurality of credit signals. In response to receiving the plurality of credit signals, the communications switch allocates the credit amount for each radio unit, and the communications switch also sets, within the communications switch, the personal access number for each debit card for each radio unit 80. A communications channel identified with each personal access number is assigned a path through the base station 50.

As shown in FIG. 3, the base station 50 may be embodied as a commercial place of business, for example, a candy store, a bodega, or a department store, with an antenna 52 coupled to the base station 50. The base station 50 transmits and receives signals to and from a radio unit 80 of a user 81, respectively, using radio waves 54 over broadcast channel frequencies. Furthermore, in the preferred embodiment, the wireless debit card system may further include a debit meter 100 operatively coupled to the base station 50, as shown in FIG. 3.

In an alternate embodiment, as illustrated in FIG. 4, the wireless debit card system may be embodied as a base station 50, a communications channel 60, an end station 70, and various radio units, with the radio units embodied as, for example, a radio telephone 82, a facsimile machine 84, an automobile 86, and a personal computer 88, with each of the radio units 82, 84, 86, 88 capable of transmitting and receiving radio frequencies. Each of the radio units 82, 84, 86, 88 communicates with the base station 50 via radio waves 54 over broadcast channel frequencies. The wireless debit card system may further include a debit meter 100 operatively coupled to the base station 50. At the time of purchase of the debit card and/or the radio unit 80, the debit card to be used with the radio unit 80 may have an initial credit amount and an initial personal access number stored on the debit card.

As the radio units 80 may be embodied as radio telephones, radio facsimile machines, and the like, and as the base station 50 may be coupled to devices connected through telephone lines, for example, fixed wire telephones, mainframe computers, and the like, the personal access number of the debit card may be used as a telephone number, or the personal access number may encode or incorporate telephone numbers into the personal access number, existing telephone numbers, telephone lines, and telephone accounts may operate in conjunction with the wireless debit card system.

Moreover, as illustrated in FIG. 4, the base station 50 may further be coupled to other devices, for example, telephone 92 and facsimile machine 94, through a telephone network 90, where devices, which may include a telephone 92 and a facsimile machine 94, are coupled to the telephone network 90 by telephone wires 98, and where the base station 50 is coupled to the telephone network by telephone wires 96. The wireless debit card system, as embodied in FIG. 4, allows both wireless and wired devices to access the base station 50.

As shown in FIG. 5, each radio unit 80 in the wireless debit card system includes a first processing means, means for reading a credit amount and a personal access number from a debit card, and means for communicating the credit amount and the personal access number as a credit signal. The first processing means may be embodied as a controller 204 which may perform processing functions as a first processor for generating a credit signal from the credit amount and from the personal access number. The communicating means may be embodied as a transceiver 202, and the reading means may be embodied as reader 208. The transceiver 202 includes an antenna, and the transceiver 202 is operatively coupled to the base station 50 via radio waves over broadcast channels, and the transceiver 202 communicates with the base station 50 and with other devices over the broadcast channel frequencies.

The user accesses the wireless debit card system by accessing the radio unit 80 with the debit card by inserting the debit card into a slot in the radio unit 80. The radio unit 80 may also include memory 206 for storing the credit amount and the personal access number after the credit amount and the personal access number are read by the reader 210 of the radio unit 80.

For use with a debit card 30 with a magnetic strip 32, as shown in FIG. 1, the reader 208 of radio unit 80 may include a magnetic reader for reading the credit amount and the personal access number from the magnetic format of the magnetic strip 32 of a debit card 30.

Figure 2:
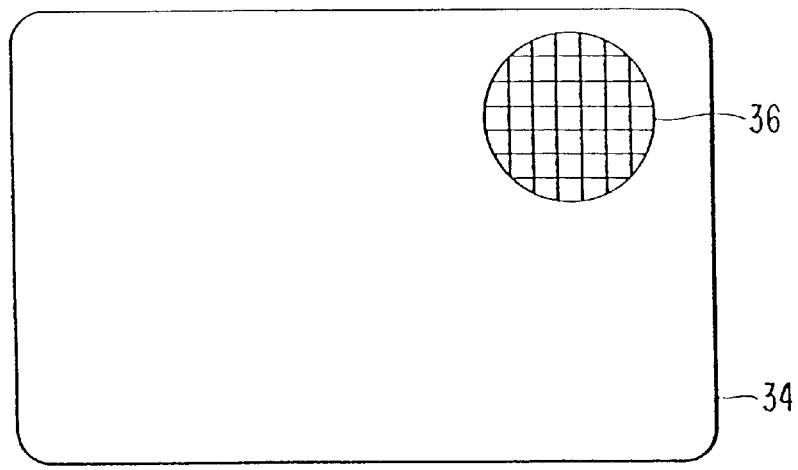
FIG. 2 shows a prior art debit/credit card having a computer chip with a memory.

For use with a debit card 34 with a computer chip 36 having a memory, for example, smartcards, as shown in FIG. 2, the reader 208 of radio unit 80 may include a reader processor 210 for reading the credit amount and the personal access number from the memory of the computer chip. The operation of the wireless debit card system is not dependent on the format of the information storage on the debit cards, so magnetic strip cards and smartcards may both be used in the wireless debit card system, where magnetic strip cards and smartcards are read by compatible debit card readers included in the radio units.

As shown in FIG. 6, the radio unit 80, in an alternate embodiment, may further include changing means, embodied as writer 212 using controller 204 and memory 206, for changing the credit amount of the debit card. The writer 212 may also change the personal access number of the debit card.

For use with a debit card 30 with a magnetic strip 32, as shown in FIG. 1, the writer 212 of radio unit 80 may include a magnetic writer for writing the credit amount and the personal access number from the magnetic format of the magnetic strip 32 of a debit card 30.

For use with a debit card 34 with a computer chip 36 having a memory, for example, smartcards, as shown in FIG. 2, the writer 208 of radio unit 80 may include a writer processor 214 for writing and/or rewriting the credit amount and the personal access number to the memory of the computer chip. The operation of the wireless debit card system is not dependent on the format of the information storage on the debit cards, so magnetic strip cards and smartcards may both be used and rewritten in the wireless debit card system, where magnetic strip cards and smartcards are written and/or rewritten by compatible debit card readers included in the radio units.

Figures 10, 11:
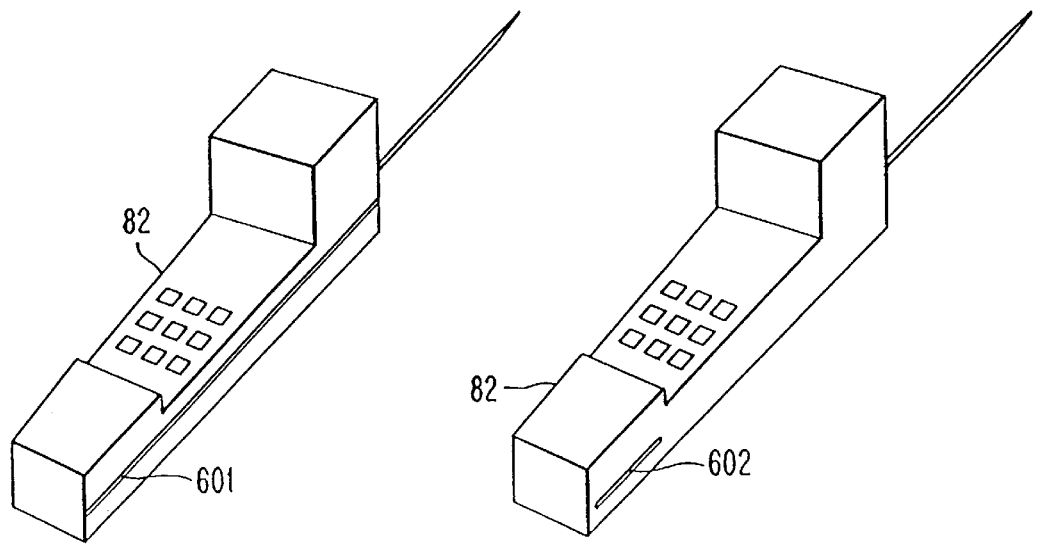
FIGS. 10–13 illustrate embodiments of radio telephones having slots for a debit card.
Figures 12, 13:
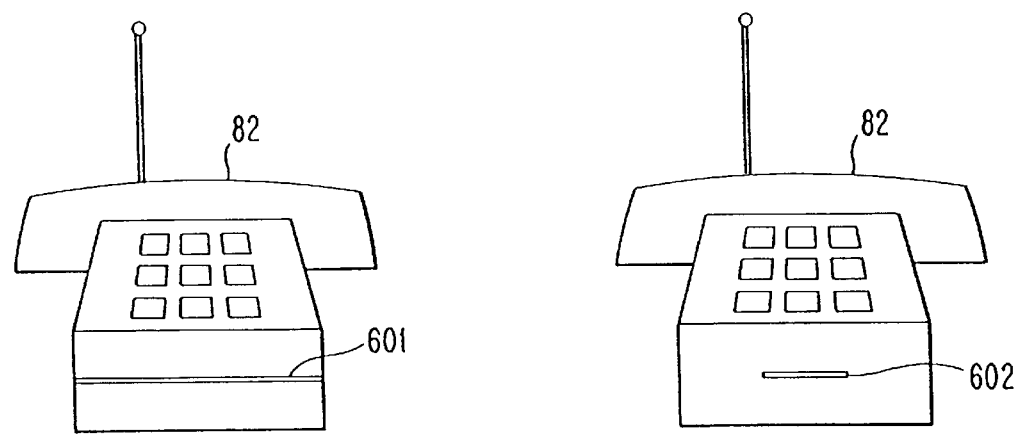

The radio unit 80 includes an antenna, connected to the transceiver, which may be internal or external. The radio unit 80 may be embodied as a radio telephone 82, as shown in FIGS. 10 and 12, where each radio telephone 82 includes a swipe slot 601 for swiping the debit card through the reader 208 and through the writer 212 of the radio telephone. In alternate embodiments, as shown in FIGS. 11 and 13, each radio telephone 82 includes an insertion slot 602 for inserting the debit card into the reader 208 and into the writer 212 of the radio telephone 82.

Figure 14:
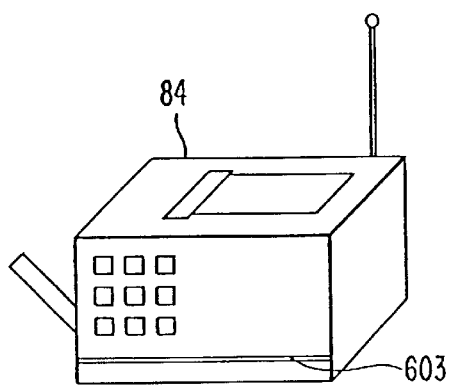
FIGS. 14–15 illustrate embodiments of radio facsimile machines having slots for a debit card.
Figure 15:
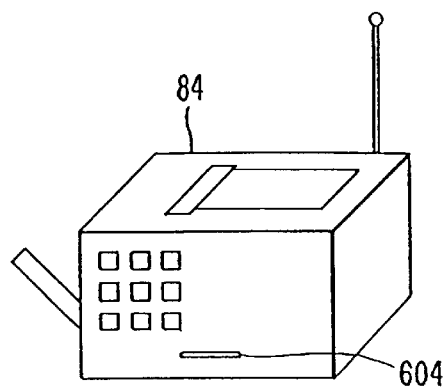
Figure 16:
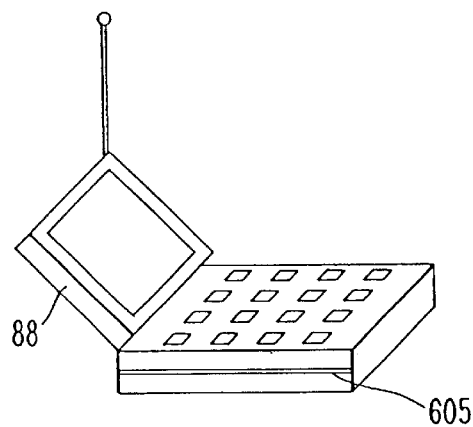
FIGS. 16–17 illustrate embodiments of radio personal computers having slots for a debit card.
Figure 17:
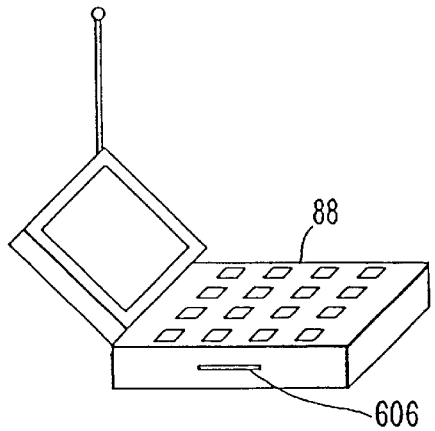
Figure 18:
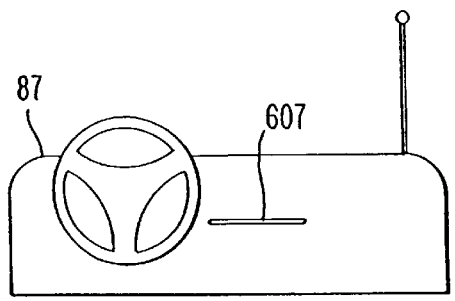
FIGS. 18–19 illustrate embodiments of the dashboards of automobiles having slots for a debit card.
Figure 19:
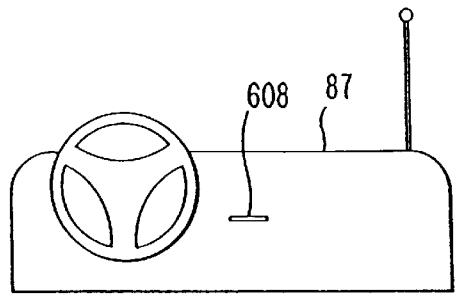

The radio units may also include radio facsimile machines, as illustrated in FIGS. 14–15, may also include radio personal computers, for example, radio laptop computers, as illustrated in FIGS. 16–17, and may also include automobiles, as illustrated in FIGS. 18–19, with each of the radio personal computers, radio facsimile machines, and automobiles including an antenna and slots for the debit cards. FIG. 14 shows a radio facsimile machine 84 with a swipe slot 603 to swipe a debit card with a magnetic strip through a magnetic reader/writer of the radio facsimile machine 84, while FIG. 15 shows a radio facsimile machine 84 with an insertion slot 604 to insert a debit card into the reader/writer of the radio facsimile machine 84. Similarly, FIGS. 16 and 17 show radio laptop computers 86 with a swipe slot 605 and with an insertion slot 606, respectively. Similarly, FIGS. 18 and 19 show the dashboard 87 of an automobile, with the dashboard 87 equipped with a swipe slot 607 and with an insertion slot 608, respectively, for swiping or inserting the debit card into the reader/writer of the automobile.

The debit card stores a credit amount and a personal access number, with the debit card storing the credit amount and the personal access number on a magnetic strip in a magnetic format or in a computer chip with a memory. A user accessing a radio unit 80 with the debit card by inserting the debit card into the reader 208 of the radio unit 80. The reader 208 reads the credit amount and the personal access number from the debit card, and the controller 204 generates a credit signal from the credit amount and the personal access number. The transceiver 202 transmits the credit signal over broadcast frequencies, using radio waves, to a base station 50.

Furthermore, as shown in FIGS. 5 and 6, each radio unit 80 may further include display means for displaying the credit amount of the debit card. The display means may be embodied as a display 216, as shown in FIGS. 5 and 6, respectively. The display means may also display the personal access number of the debit card. In addition, the first processing means, embodied as controller 204, may also store the credit amount as a count in a counter, and may deduct charges for use of the radio unit 80 by decreasing the count as the charges are incurred by the user. The first processing means, embodied as controller 204, may further send the count to the display means for display to the user to indicate to the user the present amount of credit available as the user incurs charges against the previously purchased credit amount.

In addition, each radio unit 80 may further include audio means for producing sounds. As shown in FIGS. 5 and 6, the audio means may be embodied as a speaker 218, since the radio unit 80 may be embodied as a radio telephone, as a radio facsimile machine, as a radio personal computer, or as an automobile, and since telephones, facsimile machines, personal computers, and automobiles usually provide audio means embodied as speakers. The controller 204 may generate a warning signal to indicate when the count has decreased below, or crosses, a predetermined threshold; therefore, the warning signal is produced when the available credit for the debit card has reached a low level and requires an increase in the credit amount for further use of the radio unit 80. Alternately, the controller 204 may generate the warning signal to indicate when the count has decreased to zero to indicate that the debit card does not have any available credit for further charges by the user on the radio unit 80.

In response to the warning signal from the controller 204, the speaker 218 emits one or more sounds to indicate that the credit of the debit card is low, using a low credit warning sound, of that the credit of the debit card has run out, using a zero credit warning sound. The audio means may further include synthesizer means, embodied as a voice synthesizer, for generating synthesized voice messages, permitting the low credit warning sound and the zero credit warning sound to include synthesized voice messages to convey to the user the amount of available credit, the lack of available credit, or other voice messages.

The base station 50 receives the broadcasted credit signal, and responds to receiving the credit signal by relaying the credit signal over a communications channel 60 to an end station 70, as shown in FIGS. 3 and 4. The communications channel 60 may be embodied as a telephone network, with both the base station 50 and the end station 70 being coupled to the telephone network by telephone lines. Therefore, the wireless debit card system may easily be connected with the existing telephone networks, and also may be easily implemented in commercial places of business; for example, a base station 50 may be installed in a telephone jack in a candy store, a bodega, or a department store.

In addition, the communications channel 60 may alternately be embodied as a wireless communications system with the base station 50 and the end station 70 broadcasting over radio frequencies.

As illustrated in FIG. 7, the base station 50 includes a transceiver 302 and a controller 304. As shown in FIG. 3, the base station 50 may be located at a commercial place of business, for example, a candy store, a bodega, or a department store, with an antenna 52 coupled to the base station 50, and the base station 50 relays the credit signal over a communications channel 60 to an end station 70, as shown in FIGS. 3 and 4. As shown in FIG. 3, the antenna 52 may be installed on the roof of the commercial place of business.

As illustrated in FIG. 8, the end station 70 includes a communications switch 420, a controller 404, and a memory 406. The communications switch 420 is responsive to the credit signal from a radio unit 80 for generating a first control signal to allocate the credit amount of the debit card to the radio unit 80, and the first control signal is also used to set a radio unit access number of the radio unit 80 to the personal access number of the debit card. The end station 70 establishes and uses a communications path through the base station 50 to send the first control signal to the radio unit 80.

In response to the first control signal from the end station 70, the radio unit 80 allocates the credit amount of the debit card to the radio unit 80, and radio unit 80 sets a radio unit access number of the radio unit 80 to the personal access number of the debit card.

The wireless debit card system further includes having the end station 70 generate a second control signal for changing the credit amount of the debit card after the credit amount to the debit card has been set. In response to the second control signal, the changing means of the radio unit 80 changes the credit amount of the debit card. In a further embodiment, the changing means of the radio unit 80, in response to the second control signal, changes the personal access number of the debit card. In changing the credit amount and the personal access number of the debit card, the changing means of the radio unit 80, embodied as writer 212 using controller 204 and memory 206, using data from the second control signal, revises the credit amount and the personal access number, respectively, stored in memory 206. In revising the credit amount and the personal access number, the controller 204 generates an updated credit amount and an updated personal access number, respectively. The changing means then stores the updated credit amount and the updated personal access number, respectively, on the debit card.

For use with a debit card 30 with a magnetic strip 32, as shown in FIG. 1, the writer 212 of radio unit 80 may include a magnetic writer for writing and/or rewriting the credit amount and the personal access number from the magnetic format of the magnetic strip 32 of a debit card 30.

For use with a debit card 34 with a computer chip 36 having a memory, for example, smartcards, as shown in FIG. 2, the writer 212 of radio unit 80 may include a writer processor 214 for writing and/or rewriting the credit amount and the personal access number to the memory of the computer chip 36. The operation of the wireless debit card system is not dependent on the format of the information storage on the debit cards, so magnetic strip cards and smartcards may both be used and rewritten in the wireless debit card system, where magnetic strip cards and smartcards are read by compatible debit card readers included in the radio units.

As shown in FIGS. 3 and 4, the wireless debit card system may include a debit meter 100 coupled to the base station 50. FIG. 9 shows the debit meter 100 with storing means for storing a credit amount and a personal access number of the debit card, and changing means for changing the credit amount of the debit card. The changing means may also change the personal access number of the debit card. In the preferred embodiment shown in FIG. 9, the storing means is embodied as a memory 506, and the changing means is embodied as a writer 512 using controller 504 and memory 506.

In response to a second control signal from the end station 70, the debit meter 100 changes the credit amount of the debit card using the writer 512. Also, in response to the second control signal from the end station 70, the debit meter 100 may change the personal access number of the debit card using the writer 512.

For use with a debit card 30 with a magnetic strip 32, as shown in FIG. 1, the writer 512 of debit meter 100 may include a magnetic writer for writing and/or rewriting the credit amount and the personal access number from the magnetic format of the magnetic strip 32 of the debit card 30.

For use with a debit card 34 with a computer chip 36 having a memory, for example, smartcards, as shown in FIG. 2, the writer 512 of debit meter 100 may include a writer processor 214 for writing and/or rewriting the credit amount and the personal access number to the memory of the computer chip 36. The operation of the wireless debit card system is not dependent on the format of the information storage on the debit cards, so magnetic strip cards and smartcards may both be used and rewritten in the wireless debit card system, where magnetic strip cards and smartcards are written and/or rewritten by a compatible debit card writer included in the debit meter 100.

The debit meter 100 may further include meter processing means for processing the credit amount and the personal access number of a debit card. The meter processing means is embodied as a controller 504 in FIG. 9, which may perform processing functions as a meter processor. In addition the debit meter 100 may further include reading means, which may be embodied as a reader 508, for reading the credit amount and the personal access number of the debit card.

For use with a debit card 30 with a magnetic strip 32 as shown in FIG. 1, the writer 508 of debit meter 100 may include a magnetic reader for reading the credit amount and the personal access number from the magnetic format of the magnetic strip 32 of the debit card 30.

For use with a debit card 34 with a computer chip 36 having a memory, for example, smartcards, as shown in FIG. 2, the reader 508 of debit meter 100 may include a reader processor 510 for reading the credit amount and the personal access number from the memory of the computer chip 36. The operation of the wireless debit card system is not dependent on the format of the information storage on the debit cards, so magnetic strip cards and smartcards may both be used in the wireless debit card system, where magnetic strip cards and smartcards are read by compatible debit card readers included in the radio units.

The debit meter 100 may also include a swipe slot for swiping the debit card through the writer 512 of the debit meter 100. In alternate embodiments, the debit meter 100 may include an insertion slot for inserting the debit card into the reader 508 and writer 512 of the debit meter 100.

The wireless debit card system further includes having the end station 70 generate a second control signal for changing the credit amount of the debit card after the credit amount to the debit card has been set. In response to the second control signal, the changing means of the debit meter 100 changes the credit amount of the debit card. In another embodiment, the changing means of the debit meter 100, in response to the second control signal, changes the personal access number of the debit card. In changing the credit amount and the personal access number of the debit card, the changing means of the debit meter 100, embodied as writer 512 using controller 504 and memory 506, using data from the second control signal, revises the credit amount and the personal access number, respectively, stored in memory 506. In revising the credit amount and the personal access number, the controller 504 generates an updated credit amount and an updated personal access number, respectively. The changing means then stores the updated credit amount and the updated personal access number, respectively, on the debit card.

In the preferred embodiment, the debit meter 100 of FIG. 9 is used with the radio units 80 as embodied in FIG. 5, so that the debit meter 100 may perform the functions of changing and writing/rewriting the credit amount and the personal access number of the debit card, while the radio units 80 embodied in FIG. 5 of the wireless debit card system need not be equipped with writing means. On the other hand, radio units 80 embodied in FIG. 6, may be equipped with changing means, perform the functions of the debit meter 100, so that the wireless debit card system need not be equipped with a debit meter 100. Still further, the wireless debit card system may include the radio units 80 of FIG. 5, the radio units 80 of FIG. 6, and the debit meter 100 of FIG. 9, allowing debits cards to be initially purchased at the base station 50 and then having the debit meter 100 at the base station 50 add to the purchased debit card any credit purchased by the debit card purchaser at the base station 50.

The radio unit equipped with changing means then may update the credit amount and the personal access number as the debit card purchaser uses the debit card. However, users with radio units unequipped with changing means utilizes the debit meter 100 at the base station 50, as shown in FIG. 3, to update the credit amount, i.e. purchase and add credit to the debit card, and also to update the personal access number of the debit card. The positioning of base stations and debit meters in candy stores, bodegas, department stores, and the like, thus permits convenient local purchases and local transactions with debit cards to access mobile radio telephone services and other services charged and debited by radio waves, for example, radio facsimile machine services, radio personal computer services, automobile services, and the like. For example, telephones, facsimile machines, personal computers, automobiles, etc. capable of communication service and usage charges and debiting the charges by radio wave, may therefore be leased or rented with greater convenience.

The present invention further includes a method, using a wireless debit card system, comprising the steps of accessing a radio unit 80 with a debit card; reading a credit amount and a personal access number from the debit card; generating a credit signal from the credit amount and the personal access number; transmitting the credit signal over a broadcast channel; receiving the credit signal at a base station 50; relaying the credit signal from the base station 50 to the end station 70 over a communications channel 60; switching the credit signal at the end station 70 using switch 420; allocating the credit amount of the debit card to the radio unit 80 with a communication path through the base station 50; and setting a radio unit access number of the radio unit 80 to the personal access number of the debit card with a communication path through the base station 50.

The method may further include the steps of generating a second control signal at the end station 70; and changing the credit amount of the debit card using the second control signal. In addition, the method may also include the step of changing the personal access number of the debit card using the second control signal.

The step of changing the credit amount may include the steps of revising the credit amount as an updated credit amount; and storing the updated credit amount on the debit card. The step of changing the personal access number may include the steps of revising the personal access number as an updated personal access number; and storing the updated personal access number on the debit card.

For a debit card 30 having a magnetic strip 32 as shown in FIG. 1, the step of reading the credit amount and the personal access number on the debit card 30 may include the step, using a reader 208, embodied as a magnetic reader in the radio unit 80, of reading the magnetic format of the magnetic strip 32 on the debit card 30; and the step of storing the credit amount and the personal access number on the debit card 30 may include the step of writing, using a writer 212, embodied as a magnetic writer in the radio unit 80, the credit amount and the personal access number in a magnetic format on the magnetic strip 32 on the debit card 30.

Alternately, for a debit card 34 having a chip 36 as shown in FIG. 2, the step of reading the credit amount and the personal access number on the debit card may include the step, using a reader processor 210 in the radio unit 80, of reading the memory on the chip 36 on the debit card 34; and the step of storing the credit amount and the personal access number on the debit card 34 may include the step of writing, using a writer processor 212 in the radio unit 80, the credit amount and the personal access number in a memory on the chip 36 on the debit card 34.

For a debit card 30 having a magnetic strip 32 as shown in FIG. 1, the step of revising the credit amount may include the step, using a first processor, embodied as a controller 204, in the radio unit 80, of generating an updated credit amount from the credit amount and from the second control signal; and the step of storing the updated credit amount on the debit card may include the step of writing, using a magnetic writer in the radio unit 80, the credit amount in a magnetic format on a magnetic strip 32 on the debit card 34.

For a debit card 30 having a chip 36 as shown in FIG. 2, the step of revising the credit amount may include the step, using a first processor, embodied as a controller 204 in the radio unit 80, of generating an updated credit amount from the credit amount and from the second control signal; and the step of storing the credit amount on the debit 30 card may include the step of writing, using a writer processor 514 in the radio unit 80, the credit amount in a memory on the chip 36 on the debit card 30.

Similarly, for debit card 30 having a magnetic strip 32 as shown in FIG. 1, the step of revising the personal access number may include the step, using a first processor, embodied as a controller 204 in the radio unit 80, of generating an updated personal access number from the personal access number and from the second control signal; and the step of storing the updated personal access number on the debit card may include the step of writing, using a writer 212, embodied as a magnetic writer, in the radio unit 80, the updated personal access number in a magnetic format on the magnetic strip 32 on the debit card 30.

Alternately, for a debit card 34 having a chip 36, as shown in FIG. 2, the step of revising the personal access number may include the step, using a first processor, embodied as a controller 204 in the radio unit 80, of generating an updated personal access number from the personal access number and from the second control signal; and the step of storing the personal access number on the debit card may include the step of writing, using a writer processor 214 in the radio unit 80, the updated personal access number in a memory on the chip 36 on the debit card 34.

In addition, the method of the present invention may also include the step of storing the credit amount and the personal access number in a debit meter 100 having a meter processor, embodied as a controller 504, and a memory 506. Using the debit meter 100, the method of the present invention may include the steps of revising the credit amount as an updated credit amount; and storing the updated credit amount in the memory 506 of the debit meter 100. In addition, the step of changing the personal access number may include the steps of revision the personal access number as an updated personal access number; and storing the updated personal access number in the memory 506 in the debit meter 100.

For a debit card 30 having a magnetic strip 32 as shown in FIG. 1, the step of storing the credit amount and the personal access number on the debit card 30 may include the step of writing, using a writer 512, embodied as a magnetic writer, in the debit meter 100, the credit amount and the personal access number in a magnetic format on the magnetic strip 32 on the debit card 30; and the step of reading the credit amount and the personal access number on the debit card 30 may include the step, using a reader 208, embodied as a magnetic reader in the radio unit 80, or reading the magnetic format of the magnetic strip 32 on the debit card 30. Alternately, for a debit card 34 having a chip 36 as shown in FIG. 2, the step of storing the credit amount and the personal access number on the debit card 34 may include the step of writing, using a meter processor, embodied as a controller 504 in the debit meter 100, the credit amount and the personal access number in a memory on the chip 36 on the debit card 34; and the step of reading the credit amount and the personal access number on the debit card may include the step, using a reader processor 210 in the radio unit 80, of reading the memory on the chip 36 on the debit card 34.

For a debit card 30 having a magnetic strip 32 as shown in FIG. 1, the step of revising the credit amount may include the step, using the meter processor, embodied as the controller 504 in the debit meter 100, of generating and updated credit amount from the credit amount and from the second control signal; and the step of storing the updated credit amount on the debit card 100 may include the step of writing, using a writer 512, embodied as a magnetic writer in the debit meter 100, the updated credit amount in a magnetic format on the magnetic strip 32 on the debit card 30. Alternately, for a debit card 34 having a chip 36 as shown in FIG. 2, the step of revising the credit amount may include the step, using the meter processor, embodied as the controller 504 in the debit meter 100, of generating and updated credit amount from the credit amount and from the second control signal; and the step of storing the updated credit amount on the debit card may include the step of writing, using the writer processor 514 in the debit meter 100, the updated credit amount in a memory on the chip 36 on the debit card 34.

Also, for a debit card 30 having a magnetic strip 32 as shown in FIG. 1, the step of revising the personal access number may include the step, using a meter processor, embodied as the controller 504 in the debit meter 100, of generating an updated personal access number from the personal access number and from the second control signal; and the step of storing the updated personal access number on the debit card 30 may include the step of writing, using a writer 512, embodied as a magnetic writer in the debit meter 100, the updated personal access number in a magnetic format on the magnetic strip 32 on the debit card 30. Alternately, for a debit card 34 having a chip 36 as shown in FIG. 2, the step of revising the personal access number may include the step, using the meter processor, embodied as the controller 504 in the debit meter 100, of generating an updated personal access number from the personal access number and from the second control signal; and the step of storing the updated personal access number on the debit card 34 may include the step of writing, using the writer processor 514 in the debit meter 100, the updated personal access number in a memory on the chip 36 on the debit card 34.

In use, a consumer or user may purchase or rent a radio unit 80 and a debit card, preferably at the location of the base station 50, for example, at a candy store, a bodega, or a department store, as illustrated in FIG. 3. The debit card may be a card 30 with a magnetic strip 32, as shown in FIG. 1, or the debit card may be a card 34 with a chip 36 having memory, as shown in FIG. 2. The type of debit card purchased and used is to be compatible with the reader/writer of the radio unit 80. Similarly, the base station 50 may be connected to a debit meter 100, as shown in FIG. 3, so the debit card purchased by the user may be compatible with the reader/writer of the debit meter 100. At the time of purchase or at the time of renting the debit card, the user may purchase an initial amount of credit to the debit card, and subsequently, the user can purchase further credit to the debit card. Whether by using a magnetic strip or by using a chip with memory, the debit card stores the current credit amount allocated to the debit card for use as a declining balance. Updates to the credit amount, due to decreases in the credit amount from charges to the debit card or due to increases in the credit amount by subsequent purchases of further credit, are stored on the debit card.

A unique personal access number is allocated to each debit card, with the personal access number being stored on the debit card. However, the personal access number to each debit card may be changed by rewriting the personal access number stored on the debit card.

After purchasing an initial credit amount and/or an increase in the credit amount of a debit card, the user may proceed to any location away from the base station 50, within a range of the broadcast transmissions of the base station 50, and the user may use the radio unit with the debit card.

During use of the debit card, the user inserts the debit card into compatible radio units, for example, radio telephones, radio facsimile machines, radio personal computers, automobiles, and the like, to access the respective radio unit. The radio telephones, radio facsimile machines, radio personal computers, automobiles, and the like are equipped with debit card readers and/or debit card writers to read and/or update, respectively, the credit amount and the personal access number of the debit card. The personal access number (PAN) may serve as a personal identification number (PIN) or as an account number for the user, but the personal access number may perform other functions, for example, the encoding of additional user information. In use with radio telephones, radio facsimile machines, and radio personal computer, the personal access number may serve as telephone number allocated to the debit card as opposed to being allocated to fixed telephone line to a fixed telephone. Therefore, the personal access number follows the user with the debit card.

In use with the radio units, the credit amount may be debited for charges incurred by use of the debit card. The credit amount may be decreased for charges from outgoing telephone calls, for example, from radio telephones, radio facsimile machines, radio personal computer with modems, and radio telephones connected through an automobile equipped with a debit card reader/writer and the appropriate transceiver instruments.

The credit amount may further be decreased for charges for services, for example, the renting the radio unit in uses, such as renting the automobile having the debit card reader/writer, as well as renting the radio telephone, renting the radio facsimile machine, renting the radio personal computer, and the like.

At each time that the credit amount is increased or decreased on the debit card, and at each time that the personal access number of the debit card is changed, the radio unit and/or the debit meter which reads and updates the credit amount and the personal access number of the debit card sends a credit signal over radio waves to the base station 50 which relays the credit signal through a communications channel 60 to an end station 70.

At the end station 70, a communications switch 420, in response to receiving the credit signal, generates a first control signal to allocate the credit amount of the debit card to the radio unit 80 accessed by the debit card, and the first control signal also sets a radio unit access number of the radio unit 80 to the personal access number of the debit card, using a communication path to the specific radio unit 80 through the base station 50, and for generating a second control signal for changing the credit amount and the personal access number of the debit card. In response to the first control signal, the radio unit 80 allocates the credit amount of the debit card to the radio unit 80, and sets the radio unit access number of the radio unit 80 to the personal access number of the debit card.

The end station 70 stores and tracks the credit amounts and the personal access numbers of each debit card, and when the credit amount of a given debit card decreases to zero or less, the end station 70 does not allocate a positive credit amount to the debit card until the user purchases additional credit at the base station 50. The controller 204 of the radio unit 80 will not operate the radio unit 80 for the user unless the credit amount of the debit card is a position amount.

A base station 50 may be wired or may be wirelessly connected to the end station 70, and the base station 50 may use sectional antennae to increase the capacity of the base station 50 to approximately 1000 users. A plurality of base stations may be located approximately one block apart in dense urban areas. The modulation of the radio wave broadcasts between the radio units and the base stations is irrelevant to the operation of the wireless debit card systems, although different methods of modulation offer different advantages. For example, spread spectrum modulation and demodulation may be used to minimized interference between radio units.

For changing the credit amount and for changing the personal access number of the debit card, the end station 70 generates a second control signal for changing the credit amount and the personal access number of the debit card. In response to the second control signal, the radio unit 80 or the debit meter 100 changes the credit amount and the personal access number of the debit card inserted into the radio unit 80 or the debit meter 100, respectively.

As the personal access number follows the debit card and as the personal access number may be changed and may be used as a telephone number, each radio unit, for example, a radio telephone, may receive telephone calls to the personal access number as opposed to a fixed telephone number specifically assigned to the radio unit. In addition, each radio unit is assigned a radio unit access number which allows the radio unit to be accessed by other radio units or by other broadcast communications, for example, mobile cellular telephone broadcasts. The radio unit access number of the radio unit may be changed to the personal access number of the debit card inserted into the radio unit, so that each radio unit serves the personal access number of the inserted debit card at any given time. The wireless debit card system also allows a radio unit to serve more than one telephone number and/or personal access number.

Since the personal access number, used as a telephone number, for example, follows the debit card, a user A can insert the debit card of user A into person B's radio telephone for user A to receive calls and to make calls at person B's radio telephone, since the end station 70 instructs person B's radio telephone to change the telephone number of the person B's radio telephone to user A's telephone number stored as a personal access number on user A's debit card. As user A uses person B's radio telephone, user A's telephone calls are charged to user A's debit card, as opposed to having user A's telephone calls being charged to person B.

In other embodiments, the insertion of user A's debit card into person B's radio telephone, for example, may initiate the end station 70 to instruct person B's radio telephone to receive calls to both user A's telephone number and also to person B's telephone number. Appropriate instructions to the controller of persons B's telephone may be used to erase user A's telephone number as an accessible telephone number for incoming calls at a later time.

It will be apparent to those skilled in the art that various modifications can be made to the wireless debit card system and method of the instant invention without departing from the scope or spirit of the invention, and it is intended that the wireless debit card system and method of the instant invention cover modifications and variations of the provided they come within the scope of the appended claims and their equivalents.

I claim:

1. A wireless debit card system comprising:

at least one radio unit, each radio unit including:
 means for detecting the accessibility of a detachable readable-writeable debit card device storing credit information including credit amount and a personal access number;
 means for updating said stored credit information of said debit card device;
 means for identifying said radio unit with a unique fixed radio unit access number;
 means for communicating with other base stations using said fixed radio unit access number as identification only,
 if said debit card device is accessible, means for communicating with at least a base station that requires both said fixed radio unit access number and said personal access number as identification; and
said base station including:
 means for receiving incoming information from at least one of said radio units;
 means for updating of a base station database based on said fixed radio unit access number, said personal access number and said credit amount;
 means for processing to produce a second credit information; and
 means for transmitting said second credit information to said radio unit device.

2. The wireless debit card system of claim 1 wherein means for receiving information from and means for transmitting information to said radio unit using radio waves over broadcast channel frequencies.

3. The wireless debit card system of claim 1 wherein means for updating of the base station database uses a debit meter.

4. The wireless debit card system of claim 1 each said radio unit further comprising a memory associated with means for updating said stored credit information for storing the read credit amount and personal access number.

5. The wireless debit card system of claim 1 wherein means for updating the credit information includes means for reading both the credit amount and the personal access number of said card device, and means for writing information back to said debit card device in response to said second credit information.

6. The wireless debit card system of claim 1 wherein each radio unit includes a radio telephone.

7. The wireless debit card system of claim 6 wherein:

said credit card device includes a magnetic strip;

means for reading of each radio telephone is a magnetic reader for reading the credit amount and the personal access number from the magnetic strip; and means for writing of each radio telephone is a magnetic writer for rewriting the magnetic strip.

8. The wireless debit card system of claim 6 wherein:

said debit card device includes a chip having a memory;

means for reading of each radio telephone is a reader processor for reading the credit amount and the personal access number for the memory of the chip; and means for writing of each radio telephone is a writer processor for rewriting the memory of the chip.

9. A radio unit for use in a wireless debit card system having at least one base station for transmitting control signals in response to received credit information, said radio unit including:

means for reading a credit amount and a personal access number from a debit card device;

a transceiver and associated antenna for receiving communications directed to selected access numbers including a fixed radio unit access number unique to said radio unit and for communicating, using radio waves, a first credit information that includes a base station;

means for verifying information received from said base station which include said fixed radio unit access numbers for said radio unit and the personal access number and credit amount for said debit card device; and means for writing the credit amount of said debit card device in response to a second credit information received from a base station.

10. The radio unit of claim 9 further comprising a memory associated with said controller and operatively coupled to said means for reading for storing the read credit amount and personal access number.

11. The radio unit of claim 9 wherein said means for writing both the credit amount and the personal access number of said debit card device in response to said second credit information.

12. The radio unit of claim 9 wherein said radio unit is a radio telephone.

13. The radio unit of claim 9 wherein said radio unit is a radio facsimile machine.

14. The radio unit of claim 9 wherein said radio unit is a microprocessor-based device.

15. The radio unit of claim 9 wherein said means for reading includes a magnetic reader for reading the credit amount and the personal access number from a magnetic strip of said debit card device; and means for writing is a magnetic writer for rewriting the magnetic strip.

16. The radio unit of claim 10 wherein said means for reading is a reader processor for reading the credit amount and the personal access number from a memory of a chip of said debit card device; and means for writing is a writer processor for rewriting the memory of the chip.

* * * * *